US011925940B2

(12) United States Patent
Holenstein et al.

(10) Patent No.: US 11,925,940 B2
(45) **Date of Patent: *Mar. 12, 2024**

(54) ROLLER GROUPS FOR GRINDING DEVICES, GRINDING DEVICES, AND METHODS

(71) Applicant: BÜHLER AG, Uzwil (CH)

(72) Inventors: Philippe Holenstein, Henau (CH); Lukas Studerus, Niederuzwil (CH); Daniel Rickenbach, Wittenwil (CH); Daniel Mark, Wil (CH); Heribert Weber, Arbon (CH)

(73) Assignee: Bühler AG, Uzwil (CH)

( * ) Notice: Subject to any disclaimer, the term of this patent is extended or adjusted under 35 U.S.C. 154(b) by 75 days.

This patent is subject to a terminal disclaimer.

(21) Appl. No.: 17/686,544

(22) Filed: Mar. 4, 2022

(65) Prior Publication Data

US 2022/0184628 A1 Jun. 16, 2022

Related U.S. Application Data

(63) Continuation of application No. 17/058,892, filed as application No. PCT/EP2019/063716 on May 28, 2019, now Pat. No. 11,266,993.

(30) Foreign Application Priority Data

May 28, 2018 (EP) .................................... 18174570

(51) Int. Cl.
*B02C 4/06* (2006.01)
*B02C 4/38* (2006.01)

(52) U.S. Cl.
CPC . *B02C 4/06* (2013.01); *B02C 4/38* (2013.01)

(58) Field of Classification Search
CPC .................................. B02C 4/06; B02C 4/38
(Continued)

(56) References Cited

U.S. PATENT DOCUMENTS

| | | | |
|---|---|---|---|
| 236,104 | A | 12/1880 | Stevens |
| 1,349,221 | A | 8/1920 | Nolen |

(Continued)

FOREIGN PATENT DOCUMENTS

| | | | |
|---|---|---|---|
| CH | 300 578 | A | 10/1954 |
| DE | 524 055 | C | 5/1931 |

(Continued)

OTHER PUBLICATIONS

DE19715210 Gratzer (Oct. 15, 1998) MT (Year: 1998).*
(Continued)

*Primary Examiner* — Adam J Eiseman
*Assistant Examiner* — Fred C Hammers
(74) *Attorney, Agent, or Firm* — Finch & Maloney PLLC

(57) ABSTRACT

Roller packages (IO) for grinding devices (70), comprising a first roll (11), which is maintained by at least one first bearing body (13), and a second roll (12), which is maintained by at least one second bearing body (14). The first bearing body (13) and the second bearing body (14) are prestressed against each other and comprise stop elements (17,19) with stop surfaces (18, 20), the contact of which counteracts a contact of the rolls (11, 12). The rotational position of the first stop element (17) determines the minimum width of the grinding gap. Also disclosed are grinding devices (70), methods for operating a roll assembly (10) and methods for determining the radial force acting between the rolls (11, 12) of a roll assembly (10).

11 Claims, 14 Drawing Sheets

Figure 1:
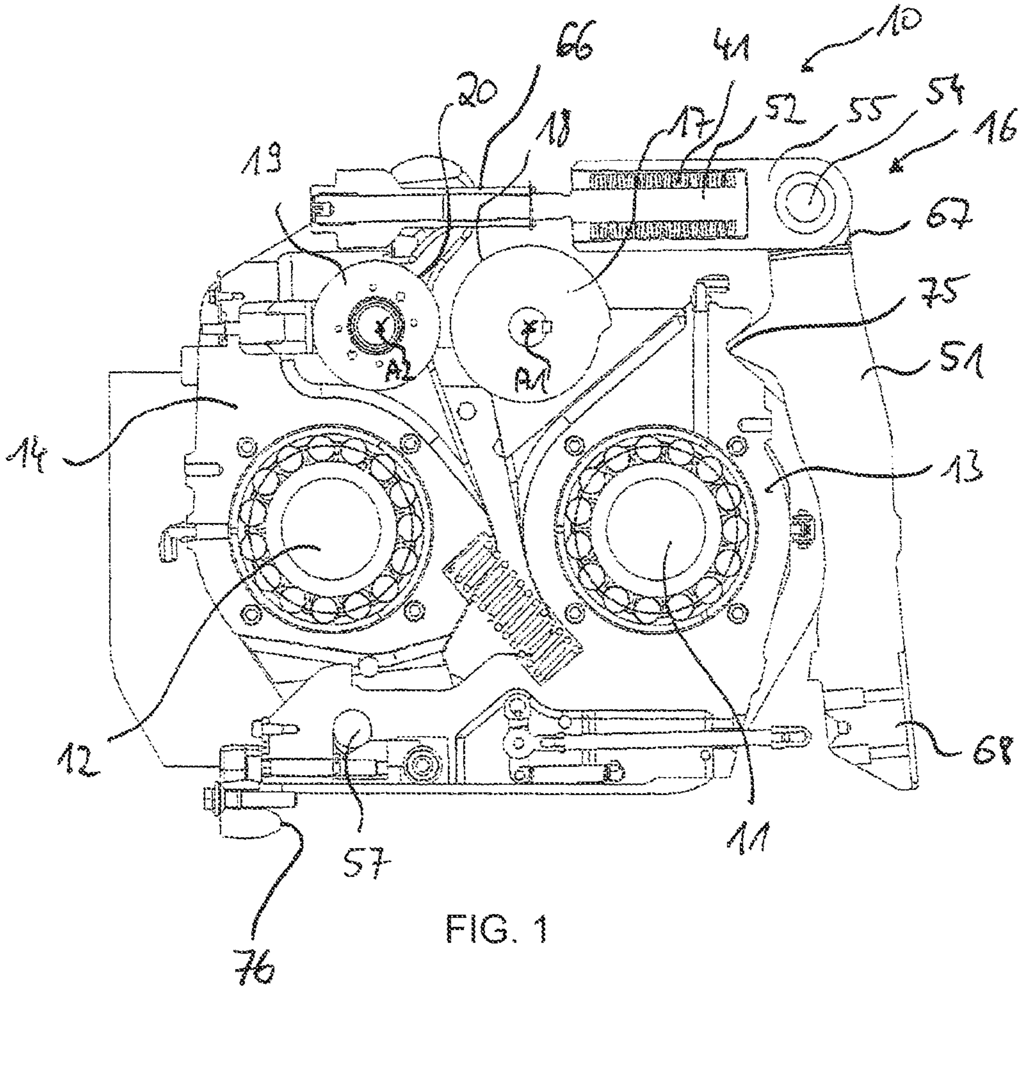

(58) Field of Classification Search
USPC .......................................................... 241/232
See application file for complete search history.

(56) References Cited

U.S. PATENT DOCUMENTS

| | | | | | |
|---|---|---|---|---|---|
| 2,080,364 | A * | 5/1937 | Tunley | B29B 7/68 384/127 |
| 2,141,647 | A | 12/1938 | Frerotte | |
| 3,174,696 | A * | 3/1965 | Hoffman, Jr. | B02C 4/286 241/230 |
| 3,509,815 | A * | 5/1970 | Lloyd | B21B 31/30 100/47 |
| 4,027,619 | A * | 6/1977 | Sturhan | G05G 1/12 116/252 |
| 4,339,083 | A * | 7/1982 | Linzberger | B02C 4/38 241/232 |
| 4,377,110 | A | 3/1983 | Matsumoto | |
| 4,603,815 | A | 8/1986 | Ripani et al. | |
| 4,608,007 | A | 8/1986 | Wood | |
| 4,674,370 | A | 6/1987 | Gutohrlein et al. | |
| 5,018,960 | A * | 5/1991 | Singer | B02C 4/38 425/DIG. 235 |
| 5,673,864 | A * | 10/1997 | Stevenson | B02C 4/38 241/234 |
| 2006/0081179 | A1 | 4/2006 | Ueberschar et al. | |
| 2012/0279270 | A1* | 11/2012 | Yabuta | B21C 37/08 72/247 |
| 2015/0089988 | A1* | 4/2015 | Morreale | B21B 31/103 72/237 |

FOREIGN PATENT DOCUMENTS

| | | | | | |
|---|---|---|---|---|---|
| DE | 595 934 | C | | 4/1934 | |
| DE | 597 775 | C | | 6/1934 | |
| DE | 1 900 879 | | | 8/1970 | |
| DE | 25 39 153 | A1 | | 3/1977 | |
| DE | 42 08 490 | A1 | | 9/1993 | |
| DE | 19715210 | A1 | * | 10/1998 | B02C 4/38 |
| DE | 101 25 378 | A1 | | 11/2002 | |
| DE | 103 16 691 | A1 | | 10/2004 | |
| DE | 10 2012 100 077 | A1 | | 7/2013 | |
| EP | 1 201 308 | A1 | | 5/2002 | |
| JP | H08-206522 | A | | 8/1996 | |
| JP | 2000-510388 | A | | 8/2000 | |
| KR | 2013-0138717 | A | | 12/2013 | |
| KR | 101566895 | | * | 11/2015 | |
| KR | 1566895 | B1 | | 11/2016 | |
| WO | 98/46354 | A1 | | 10/1998 | |
| WO | 2009/011667 | A1 | | 1/2009 | |
| WO | 2012/056461 | A1 | | 5/2012 | |
| WO | 2018/206544 | A1 | | 11/2018 | |

OTHER PUBLICATIONS

KR101566895 Woo (Nov. 9, 2015) MT (Year: 2015).*
GlobalSpec Engineering 360 (Sep. 5, 2015; website accessed Jun. 23, 2021) https://web.archive.org/web/20150905040207/http://www.globalspec.com/learnmore/mechanical_components/bearings_bushings/pillow_block_bearings (Year: 2015) (Year: 2015).*
https://web.archive.org/web/20150905040207/jttp://www.globalspec.com/learnmore/mechanical_components/bearings_bushings/pillow_block_bearings, Sep. 5, 2015.
European Search Report Corresponding to 18174570.4 dated Dec. 7, 2018.
Extended European Search Report Corresponding to 18174570.4 dated Mar. 26, 2019.
International Search Report Corresponding to PCT/EP2019/063716 dated Dec. 6, 2019.
Written Opinion Corresponding to PCT/EP2019/063716 dated Dec. 6, 2019.
Indian Office Action Corresponding to 202017052742 dated Mar. 4, 2021.
Korean Office Action Corresponding to 10-2020-7037489 dated Mar. 10, 2021.

* cited by examiner

ROLLER GROUPS FOR GRINDING DEVICES, GRINDING DEVICES, AND METHODS

The present invention is concerned with roll assemblies for milling apparatuses, with milling apparatuses and with methods for determining the radial force acting between the rolls of a roll assembly.

Various kinds of milling apparatuses with which particulate milling material is ground are used for a wide variety of industrial applications. These apparatuses include, for example, mill roll frames, malt grist mills, feed mills and coffee mills. Such milling apparatuses comprise one or more roll assemblies each having at least two rolls. The rolls can be held by a respective bearing body. Between the rolls there is formed a milling gap which is adjustable in many roll assemblies, for example by the bearing bodies being adjustable relative to one another.

The known roll assemblies are essentially designed on the same principle: a mechanical, pneumatic or electromechanical drive allows the width of the milling gap to be reduced, that is to say “moved in”, by displacing the movably mounted roll to an operating gap. The operating gap can then be further adapted during operation, for example by manual or motorized means.

Documents DE 595 934 and DE 597 775 disclose devices for regulating the contact pressure of milling rolls. These devices comprise settable spring means that allow the milling rolls to be deflected upon the passage of hard foreign bodies.

Roll assemblies have a certain degree of stiffness which can be characterized by the dependency of the radial force acting between the rolls and the width of the milling gap.

This stiffness is made up of the stiffnesses of the rolls, of the rolling bearings and of the remaining components of the roll assembly. In the moved-in state, the positions of the rolls are thus dependent on the forces prevailing in the milling gap. It is mainly the radial forces which lead to a widening of the milling gap. As long as the forces are constant, this can be corrected during operation and then has no negative influence.

However, in the case of milling material which can be drawn in between the rolls only with difficulty, the forces in the milling gap are very variable. Upon passing of the milling material through the milling gap, the rolls are pressed apart. If for a brief time no milling material is drawn in, the rolls contact one another. In such a situation, the gap stiffness has a large influence on the behavior and the properties of the milling material.

It is a first object of the invention to overcome the disadvantages of the known roll assemblies. It is particularly intended for roll assemblies to be provided in which the width of the milling gap remains as constant as possible in order to be able to produce milling material having properties which are as homogeneous as possible.

This and further objects are achieved in a first aspect of the invention by a roll assembly for a milling apparatus that comprises a first roll, which is held by at least one first bearing body, and a second roll, which is held by at least one second bearing body. The first bearing body and the second bearing body are adjustable relative to one another in such a way that a milling gap formed between the first roll and the second roll is adjustable. For example, the second bearing body can be pivotably supported on the first bearing body. The first bearing body and the second bearing body can be pretensioned with respect to one another by means of a tensioning device in such a way that the first roll and the second roll are pressed toward one another.

According to the invention, there is provision that the first bearing body has at least one first abutment body with a first abutment surface, and the second bearing body has at least one second abutment body with a second abutment surface, wherein the abutment surfaces are formed and are or can be arranged on the bearing bodies in such a way that a contact of the abutment surfaces counteracts a contact of the rolls. Here and in the following, the term “counteracting” is not necessarily understood to mean that a contact of the rolls is completely prevented; in the case of very small predetermined milling gaps width, such a contact is also allowed within the scope of the present invention.

Furthermore, the first abutment body is rotatable about a first axis of rotation. The first abutment surface is formed by a circumferential surface of the first abutment body that is eccentric with respect to the first axis of rotation, specifically in such a way that the rotational position of the first abutment body determines the minimum width of the milling gap. Here, and in the following, the circumferential surface of the first abutment body is referred to as eccentric if it is not rotationally symmetrical with respect to the first axis of rotation, that is to say if it is not transformed into itself as a result of a rotation of the first abutment body about the first axis of rotation through at least an angle which is greater than 0° and less than 360°.

If the force prevailing in the milling gap varies in a roll assembly according to the invention, only the pretensioning force between the bearing bodies changes, but not the relative position thereof. The sole yielding with respect to the milling gap thus results from the rolls and bearings. Rotating the first abutment body makes it possible for the properties of the milled milling material to be precisely set, such as for example the starch damage, the water absorption and in particular the particle size distribution of flour (particularly if, on account of a fluctuation of the mass flow supplied to the milling apparatus, the gap occupancy and thus the gap force vary).

In order to prevent a situation in which the abutment bodies come out of contact and thus the width of the milling gap becomes too large, the pretensioning force prevailing between the abutment bodies from the tensioning device should be greater than the maximum expected force between the abutment bodies that arises from the forces prevailing in the milling gap.

The tensioning device can be a constituent part of the roll assembly. However, it is preferred if the tensioning device is a constituent part of a machine stand of the milling apparatus and the roll assembly has a coupling device for releasable coupling with the tensioning device. This facilitates the mounting and demounting of the roll assembly. By virtue of this coupling, the tensioning device of the machine stand can produce the pretensioning of the bearing bodies of the roll assembly. The coupling device can be arranged on one of the bearing bodies.

The circumferential surface of the first abutment body can be cylindrical with respect to the first axis of rotation. In the circumferential direction with respect to the first axis of rotation, the circumferential surface can for example have the shape of a spiral at least in certain portions. What is to be understood by a spiral is that the distance of the circumferential surface from the first axis of rotation becomes greater or smaller in dependence on the angle. The spiral is preferably an Archimedean spiral in which the distance depends linearly on the angle.

It is advantageous if the second abutment body is rotatable about a second axis of rotation which is parallel to the first axis of rotation, and the second abutment surface is formed by a circumferential surface of the second abutment body that is rotationally symmetrical with respect to the second axis of rotation. This is because, if the first abutment body is rotated in order to adjust the width of the milling gap, the circumferential surfaces of the two abutment bodies can roll on one another, resulting in considerably less friction and therefore facilitating the adjustment. This is of importance within the scope of the present invention, since the abutment bodies are preferably pressed against one another with a high degree of pretensioning.

Furthermore, it is expedient if the first axis of rotation of the first abutment body and/or the second axis of rotation of the second abutment body are/is arranged displaceably, in particular in a direction perpendicular to the first axis of rotation. Whereas a rotation of the first abutment body produces a fine adjustment of the milling gap, a rough adjustment of the milling gap can be achieved by displacing at least one of the abutment bodies.

The fine adjustment is further facilitated if the roll assembly has a handwheel which can be rotated about a handwheel axis of rotation and which is coupled via a handwheel gear mechanism to the first abutment body in such a way that a rotation of the handwheel causes a rotation of the first abutment body. In a manner known per se, a gear mechanism can be selected in such a way that a comparatively small torque on the handwheel is converted into a high torque at the first abutment body. The handwheel gear mechanism should preferably have as high an efficiency as possible. It is also advantageous for there to be a small gear mechanism backlash in order to allow an exact as possible position indication on the handwheel and an exact as possible position of the first abutment body. All of this is important within the scope of the present invention, since the abutment bodies are preferably pressed against one another with a high degree of pretensioning. Moreover, it is preferable if the handwheel gear mechanism has a plurality of gear mechanism inputs, in particular a first gear mechanism input for the handwheel and a second gear mechanism input for motorized adjustability.

The invention also comprises a method for operating a roll assembly as described above. The method comprises a step in which the first bearing body and the second bearing body are pretensioned with respect to one another by means of the tensioning device in such a way that the first roll and the second roll are pressed toward one another.

In order to set the minimum width of the milling gap, the method can comprise a further step in which the first abutment body is rotated about a first axis of rotation in order to set the minimum width of the milling gap.

Furthermore, it is expedient if the roll assembly has a force-measuring device which comprises a first sensor for determining a first force with which the first bearing body and the second bearing body are pretensioned with respect to one another, and a second sensor for determining a second force which acts between the first abutment body and the second abutment body. One or both sensors can be force sensors for directly determining the forces. Alternatively, however, at least one of the two sensors can also be designed for indirectly determining the forces, for example as a pressure sensor with which a pressure prevailing in a cylinder (in particular in a bellows cylinder discussed further below) can be determined and from which the associated force can then be ascertained. From the two forces determined directly or indirectly by the sensors there can be calculated the force acting between the rolls.

The first sensor can for example be integrated in the tensioning device. The second sensor can for example be arranged on the second abutment body.

The invention also comprises a method for determining the radial force acting between the rolls of such a roll assembly. The method comprises a step in which the force acting between the rolls is calculated from the forces determined by means of the sensors.

In order in the simplest possible manner (without electronic elements such as gap sensors or encoders) to indicate the position of a handwheel as already mentioned above, position indicators are used in the prior art. If the operating gap is set as desired, the position of the handwheel is referenced by rotating the position indicator. It is thus possible, with required adaptation of the milling gap, for the base state to be retrieved in a simple manner. The position indicator is accommodated in the handwheel and in the prior art clamped by means of a radial adjusting screw and thus secured against rotation or sliding out. Another variant is axial tensioning toward the rear. However, the vibrations occurring during milling operation can have a considerable negative impact on the position indicator.

In this respect, oil-filled position indicators are indeed more robust; however, the clamping of the position indicator is thus more critical still: braced too weakly, the position indicator becomes detached; braced too strongly, it can be caused to break. It has already been attempted to overcome this problem using special screws. However, such a special screw can get lost. If it is replaced by a conventional screw, leakages can occur. Other disadvantages are that a tool is necessary for the referencing and that the screws are small and often poorly accessible.

A further object of the present invention consists in overcoming these disadvantages and in particular providing a roll assembly having a position indicator which can withstand the vibrations occurring during milling and which can be easily set.

To achieve this object, in the second aspect of the invention there is proposed a roll assembly for a milling apparatus that comprises a first roll and a second roll and also a handwheel which can be rotated about a handwheel axis of rotation and by means of which a milling gap formed between the first roll and the second roll can be set. This can be for example a roll assembly as described above. According to the invention, there is provision that the roll assembly has a position indicator for indicating a position of the handwheel, and the position indicator comprises a position indicator housing and an indicator element which is movable along the handwheel axis of rotation relative to the position indicator housing and which is or can be pretensioned by means of a position indicator spring in the direction of the handwheel axis of rotation with respect to the position indicator housing in such a way that it is secured against a rotation about the handwheel axis of rotation in a holding position by contact with the position indicator housing and can be rotated about the handwheel axis of rotation only upon overcoming the pretensioning brought about by the position indicator spring.

In order to be able to rotate the indicator element during referencing, it need only be pressed manually counter to the pretensioning and can then be rotated. This dispenses with the need for the aforementioned screws and tools. Moreover, the disturbing influences of vibrations can be effectively prevented during the milling operation.

In one possible embodiment, the indicator element and the position indicator housing have contact surfaces which allow a form-fitting engagement in the holding position. As a result, the disturbing influences of vibrations can be particularly effectively suppressed during the milling operation. However, alternatively or additionally to the form-fitting engagement, it is also possible for a force-fitting engagement to be present in the holding position.

It is occasionally required, for example for inspection purposes, for one or more rolls of a milling apparatus to be exchanged. For this purpose, the roll assembly can have an integrated rolling device having at least one roller which is or can be arranged on the roll assembly in such a way that the roll assembly can be placed onto a horizontal base and moved thereon by means of the at least one roller.

The bearing of the rolls in rolling bearings of the bearing bodies requires the use of lubricants whose uncontrolled escape from the bearings should be prevented. There exist sealing systems which, although robust against over-lubrication or against rough mounting conditions, cannot completely prevent an escape of the lubricants.

In order to allow a controlled escape of the lubricants, a bearing cover of the rolling bearing, which supports the roll stub, can have on its inner side a guide channel for lubricant that extends around the roll stub and is connected to an outlet opening through which lubricant can exit the guide channel. Underneath the outlet opening there can be arranged a collecting device for collecting the lubricant, for example a collecting container. The targeted collection of the escaped lubricant allows a robust sealing design which is cost-effective and assembly-friendly, runs no risk of over-lubrication and at the same time permits hygienic operation of the milling apparatus.

In order to achieve homogeneous milling over the entire length of the rolls, the rolls are often cambered. If, nevertheless, it is not possible to achieve uniform milling operation over the entire roll length, the camber can be adapted. Skewing the rolls, that is to say tilting the roller axes, affords, in addition to the gap adjustment, a control variable for influencing the milling over the roll length and achieving more uniform milling. For this purpose, there can be provision that the first roll is held by two first bearing bodies, the second roll is held by two second bearing bodies, and the first bearing bodies are adjustable independently of one another and/or the second bearing bodies are adjustable independently of one another.

In one possible embodiment, this can be achieved in that the second bearing body is pivotably supported on the first bearing body via a pivot bolt, and the pivot bolt is adjustable relative to the first bearing body, for example in the vertical direction. This can be realized for instance by the first bearing body having a wedge which is formed and arranged in such a way that a displacement of the wedge in a first direction relative to the first bearing body produces a displacement of the pivot bolt in a second direction, which is different than the first direction, relative to the first bearing body. Alternatively, however, the second bearing body can also be adjustable relative to the first bearing body by means of an eccentric.

The roll assemblies according to the invention are particularly advantageous in conjunction with a gear mechanism disclosed in the international patent application PCT/EP2018/061793, the disclosure of which with regard to this gear mechanism is incorporated in the present application by reference. In particular, it is thus included in the present invention that the roll assembly further comprises a gear mechanism which comprises a bearing housing in which an input shaft, a first output shaft and a second output shaft are accommodated, the input shaft and the first output shaft are arranged perpendicularly to one another and the first output shaft and the second output shaft are arranged parallel to one another, the input shaft and the first output shaft are operatively connected to one another via a bevel gearwheel pair, the first output shaft and the second output shaft are operatively connected to one another via a torque transmission arrangement, and the first output shaft is coupled to the first roll and the second output shaft is coupled to the second roll.

A further aspect of the invention is a milling apparatus, for example a mill roll frame, a malt grist mill, a feed mill or a coffee mill. The milling apparatus comprises a machine stand and at least one roll assembly as described above which is formed in accordance with one of the preceding claims and is or can be inserted in the machine stand. This results for the milling apparatus in the advantages already explained above for the roll assembly.

As already explained above, it is expedient if the machine stand has a tensioning device and the roll assembly has a coupling device for releasable coupling to the tensioning device. Specifically, this facilitates the mounting and demounting of the roll assembly.

To generate the pretensioning, the tensioning device can have a cylinder which is preferably configured as a bellows cylinder. It is particularly preferable for the bellows cylinder to be coupled to a venting valve. This makes it possible in an overload situation (for example when a foreign body enters the milling gap) to achieve a load relief in that the pressure prevailing in the bellows cylinder is reduced by opening the venting valve. For a rapid load relief, the venting valve should be correspondingly dimensioned.

To increase the milling gap widening in an overload situation, the tensioning device can further have at least one pretensioned spring which is in particular connected in series with the cylinder. The pretensioned spring can be for instance a disk spring assembly known per se.

The tensioning device can comprise a tension anchor, a tension bush which is pivotably mounted on a first end of the tension anchor, a tension rod which is partially accommodated in the tension bush and pretensioned by means of a spring, and the cylinder, which is coupled to a second end of the tension anchor. The tension rod can be able to be coupled to a coupling device of the roll assembly that is arranged on the second bearing body. In the mounted state of the roll assembly, the tension anchor can be supported on the bearing body at a supporting point situated between the ends of said anchor. By activating the cylinder, the second end of the tension anchor can be pressed against the first bearing body and supported thereon, with the result that the overall torque acting on the roll assembly can be reduced. The tension anchor can be pivoted about the supporting point and thus pull on the tension bush and on the tension rod. It is possible in this way for the first bearing body and the second bearing body to be pretensioned with respect to one another in such a way that the first roll and the second roll are pressed toward one another.

It has already been mentioned that, for example for inspection purposes, one or more rolls of a milling apparatus have to be exchanged. The rolls can be removed in succession, or the entire assembly can be removed. The rolls can be received at the milling surfaces, at the bearing bodies or at the roll stubs. In the first variant, there occurs lifting by means of hydraulic lift tables followed by rolling out. With reception at the bearing bodies, first of all rollers are mounted, and then the roll assembly is raised by setting down the rollers and then rolled out on the rollers. For suspended reception at the roller stubs, the latter can be lifted by means of chain hoists, and the chain hoists can then be displaced in rails. A horizontal reception at the roll stubs is also possible by rollers being fastened thereto and displaced in rails. Document EP 1 201 308 A1 further discloses a roll assembly having integrated rollers which can be set downward by means of an eccentric in order thus to be able to lift the roll assembly.

However, all these methods have disadvantages. For example, the rolling out first requires the rollers to be mounted or at least adjusted in a preparation step. In addition, the lifting of the roll assembly according to EP 1 201 308 A1 is very laborious.

In a further aspect of the invention, these disadvantages are overcome by a milling apparatus, in particular a mill roll frame, which comprises a machine stand and at least one roll assembly having a first roll and a second roll, which roll assembly is or can be inserted in the machine stand. In particular, the roll assembly can be a roll assembly as described above. The roll assembly has an integrated rolling device having at least one roller which is or can be arranged on the roll assembly in such a way that the roll assembly can be placed onto a horizontal base and moved thereon by means of the at least one roller. Furthermore, the machine stand has at least one rail on which the at least one roller of the roll assembly is movable during mounting and/or demounting of the roll assembly. Furthermore, the roll assembly has at least one contact surface, and the machine stand has at least one counter-contact surface. The contact surface and the counter-contact surface are tailored to one another and to the at least one rail in such a way that, in a mounted position of the roll assembly, by virtue of a form-fitting engagement between the contact surface and the counter-contact surface, the at least one roller of the roll assembly does not lie on the rail.

By virtue of this design according to the invention, the assembly is not lifted during demounting but is lowered onto the rollers. Moreover, the rollers of the roll assembly, when it is in the mounted position, do not lie on the rail, which protects the rollers.

Figure 2:
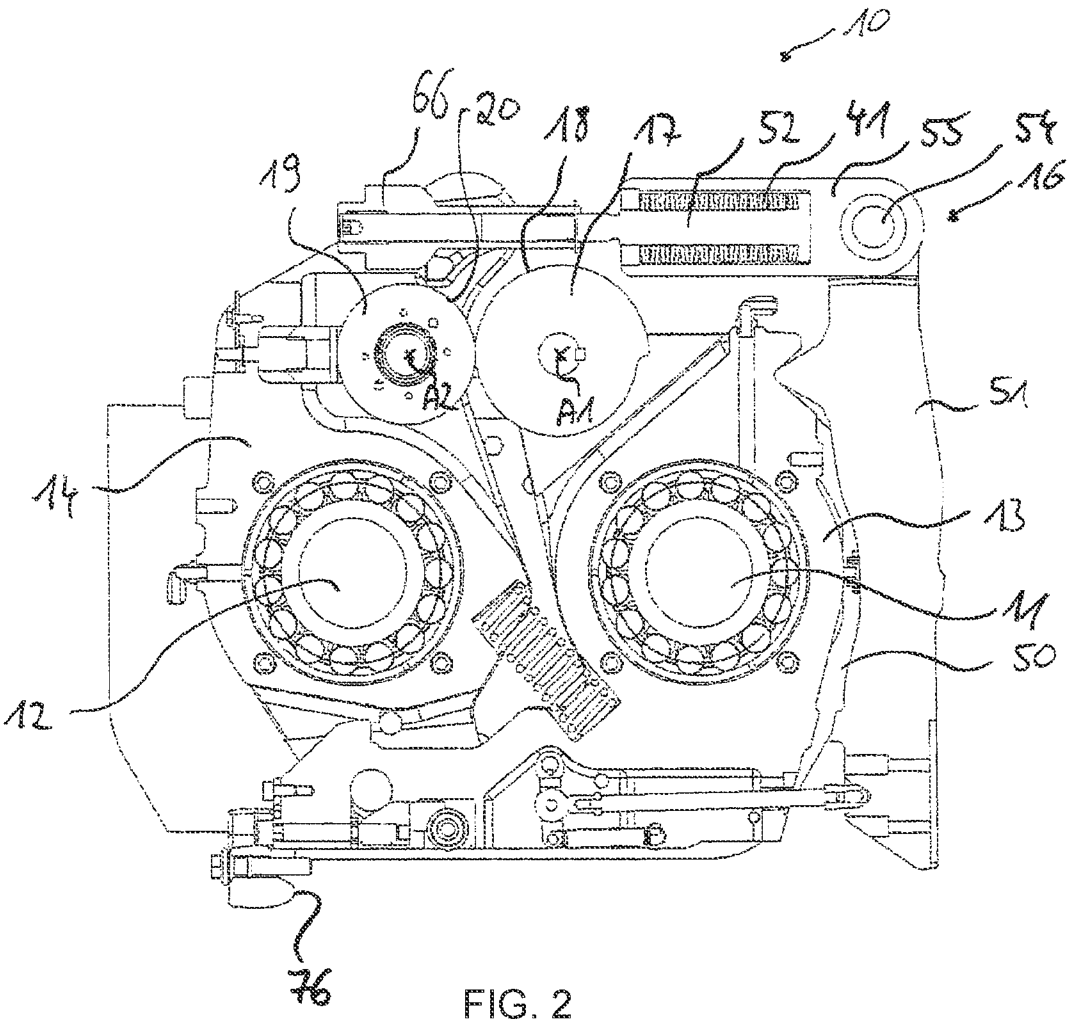
Figure 3A:
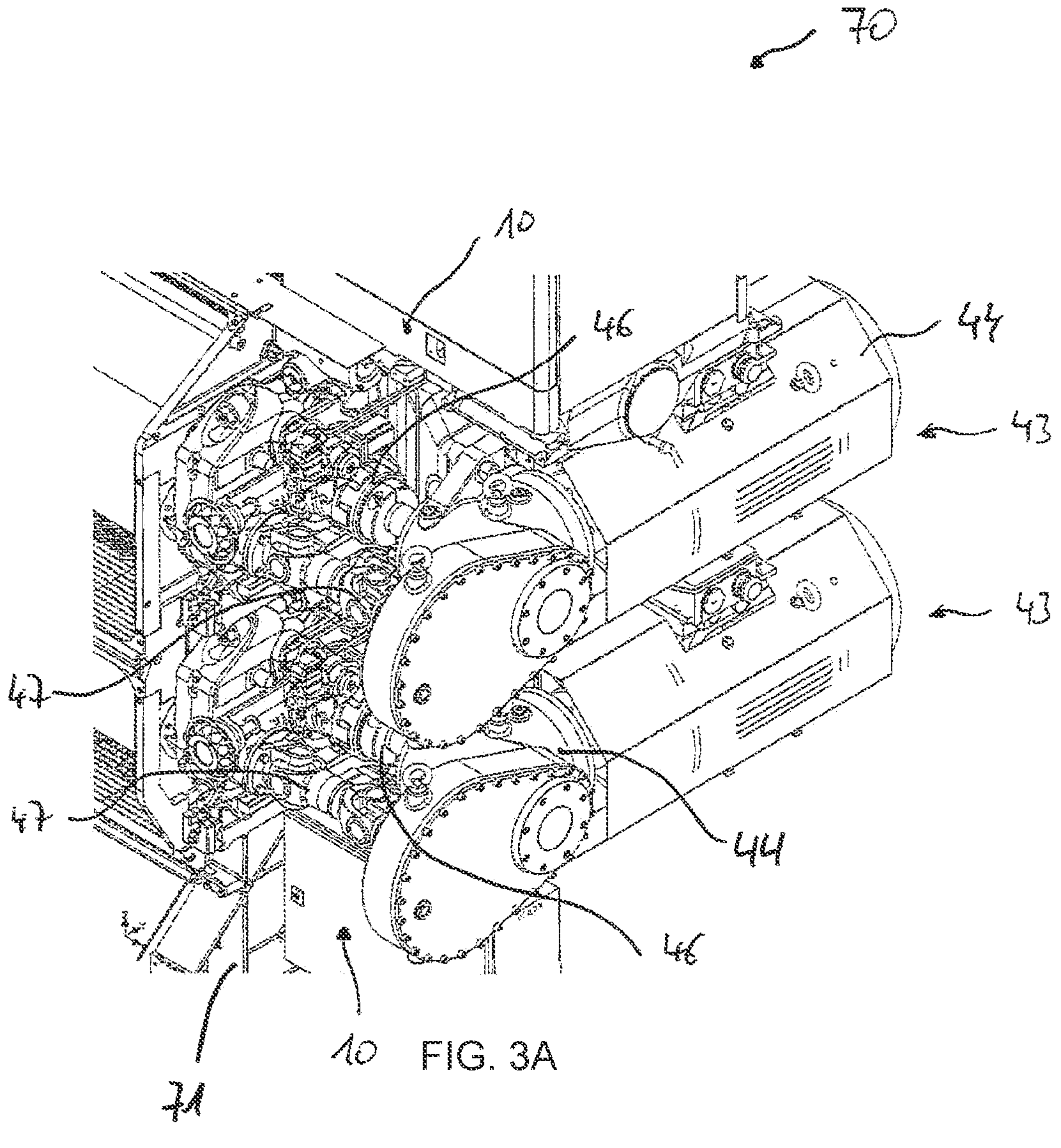
Figure 3B:
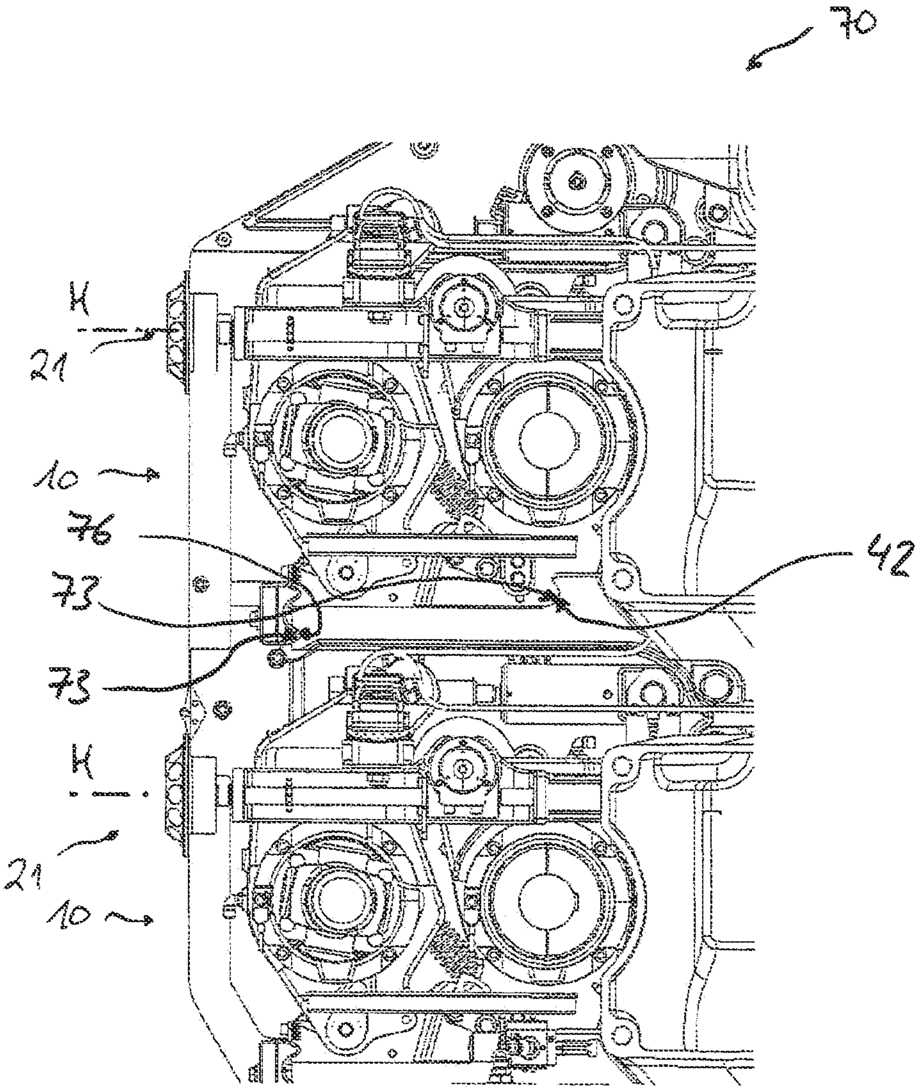
Figure 3C:
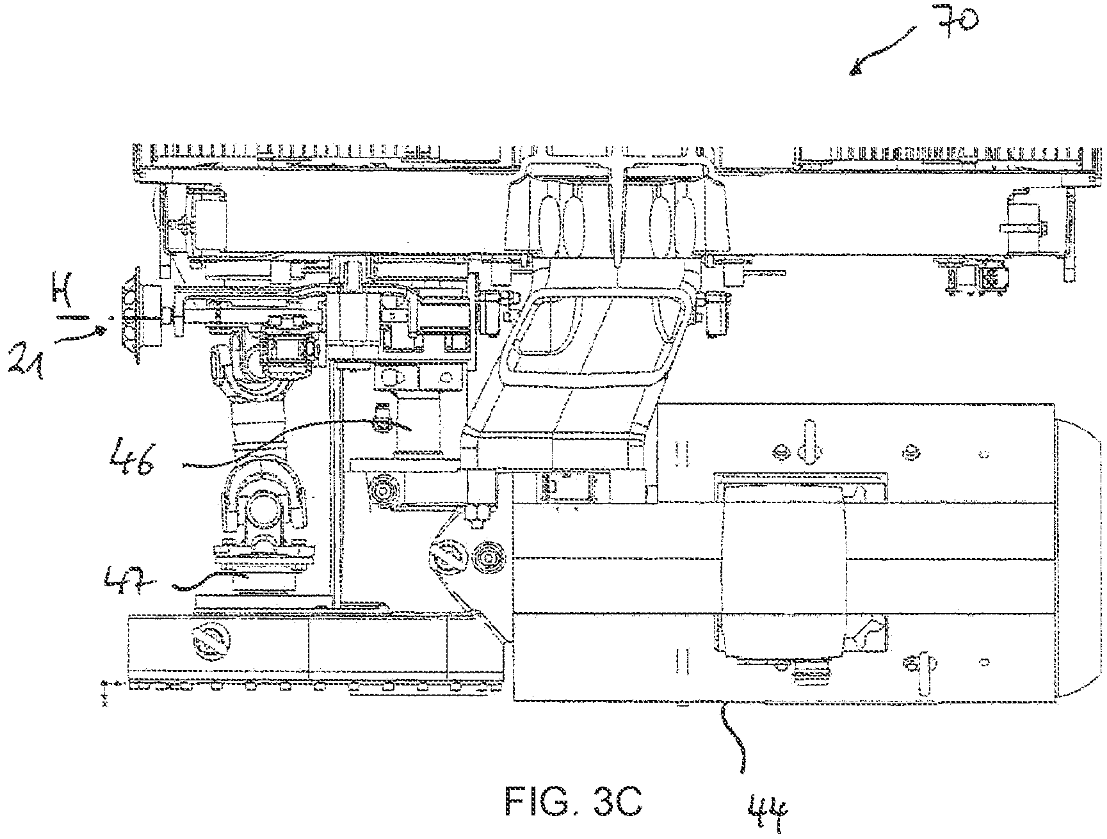
Figure 4:
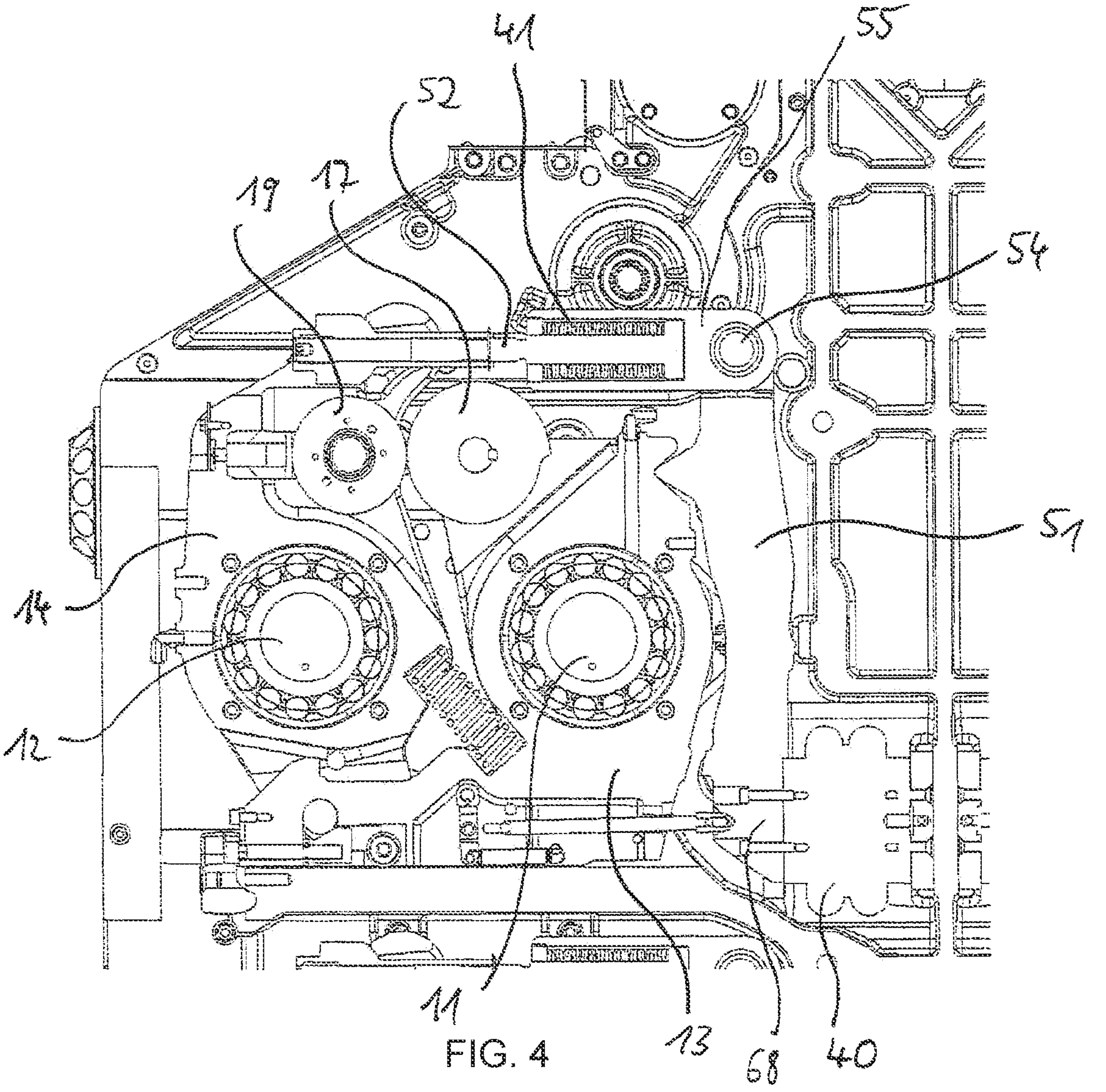
Figure 5:
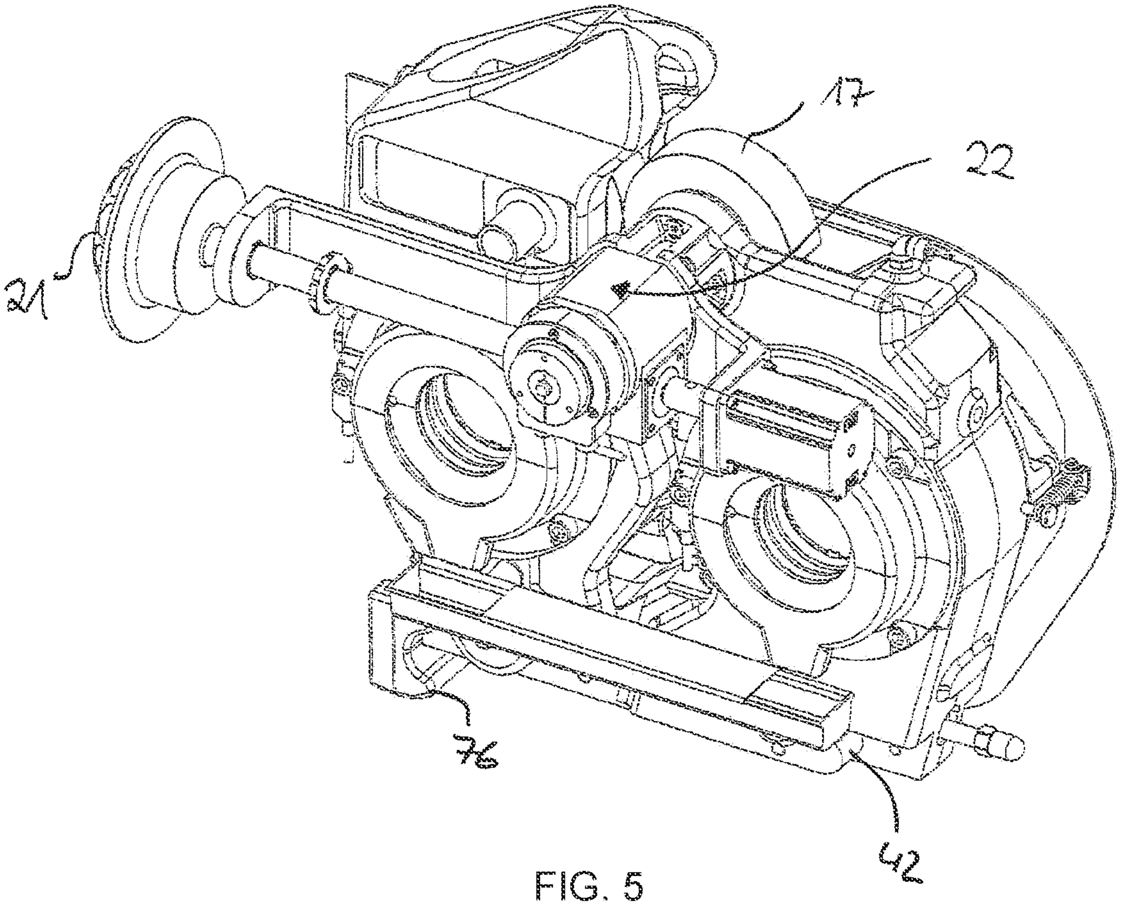
Figure 6:
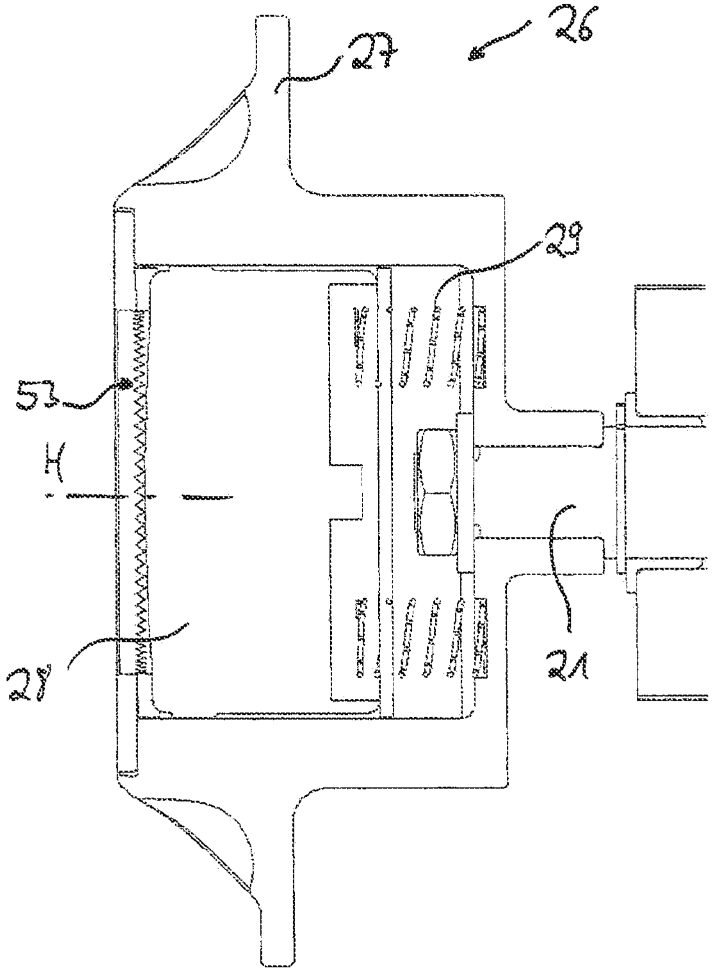
Figure 7:
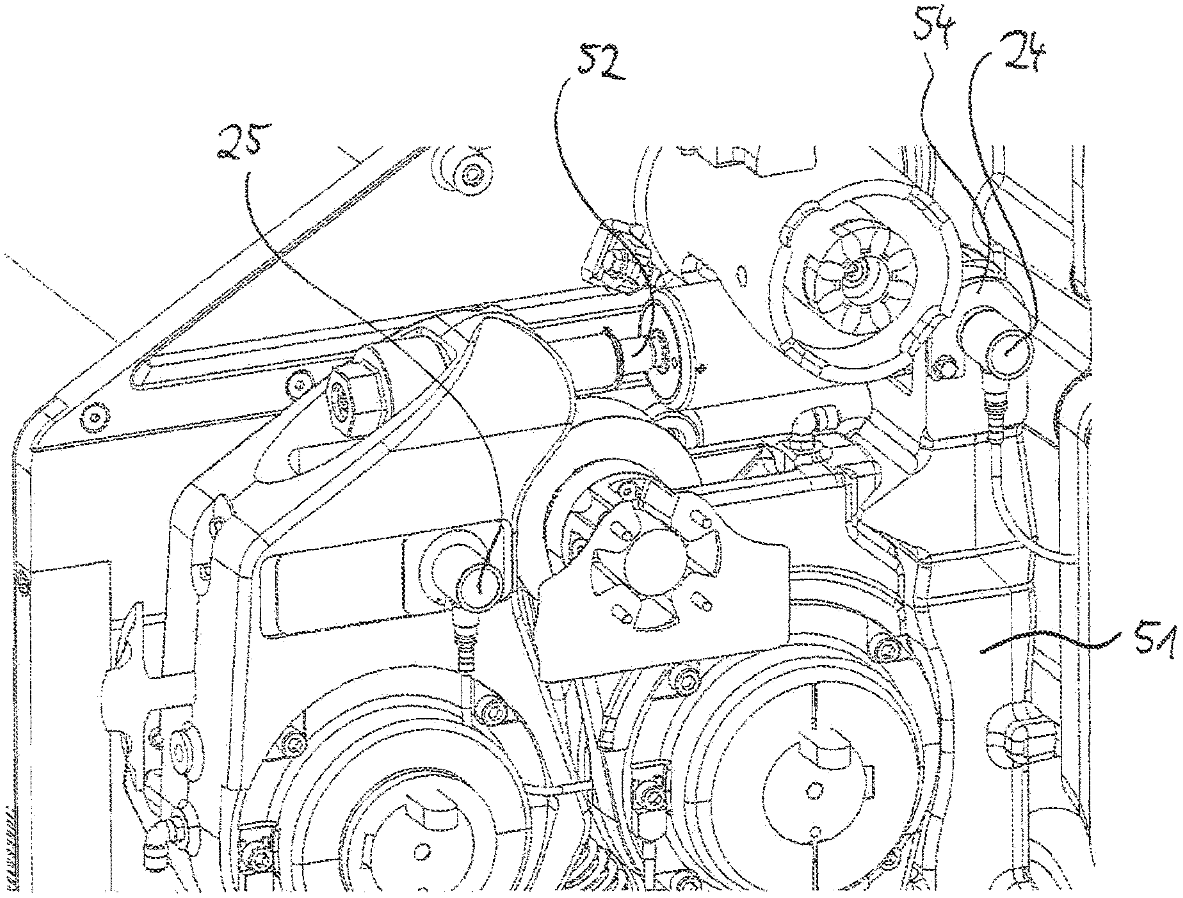
Figure 8:
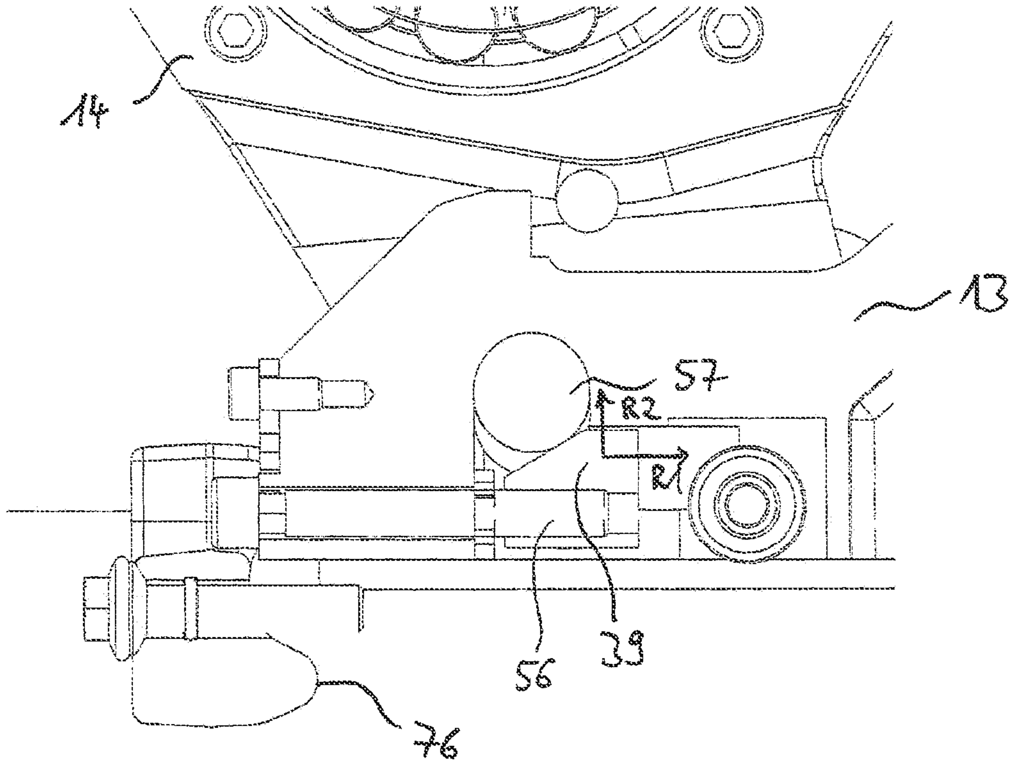
Figure 9:
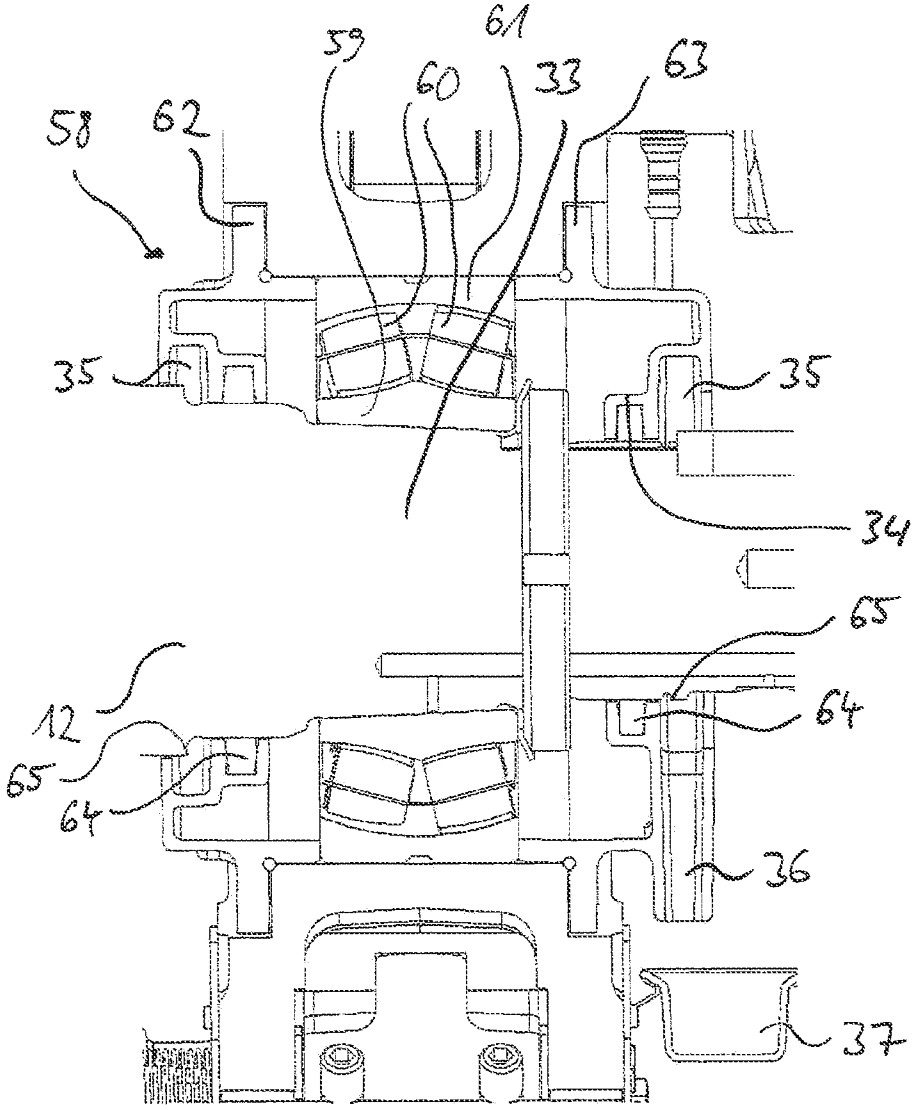
Figure 10:
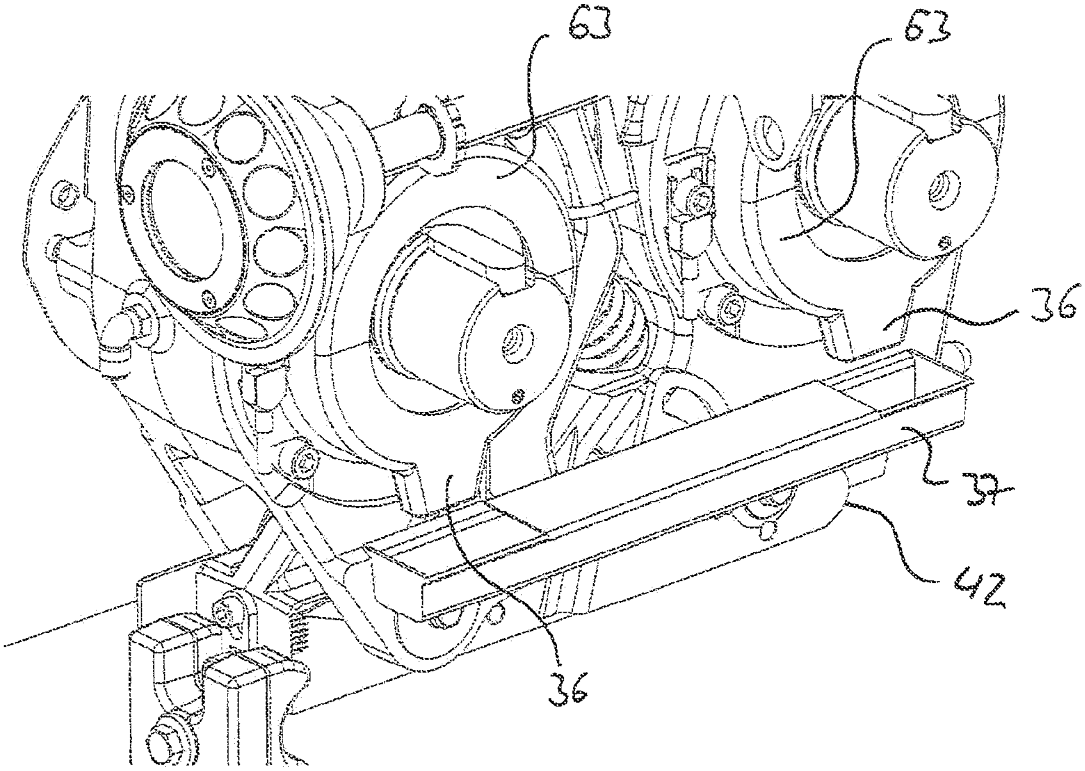
Figure 11:
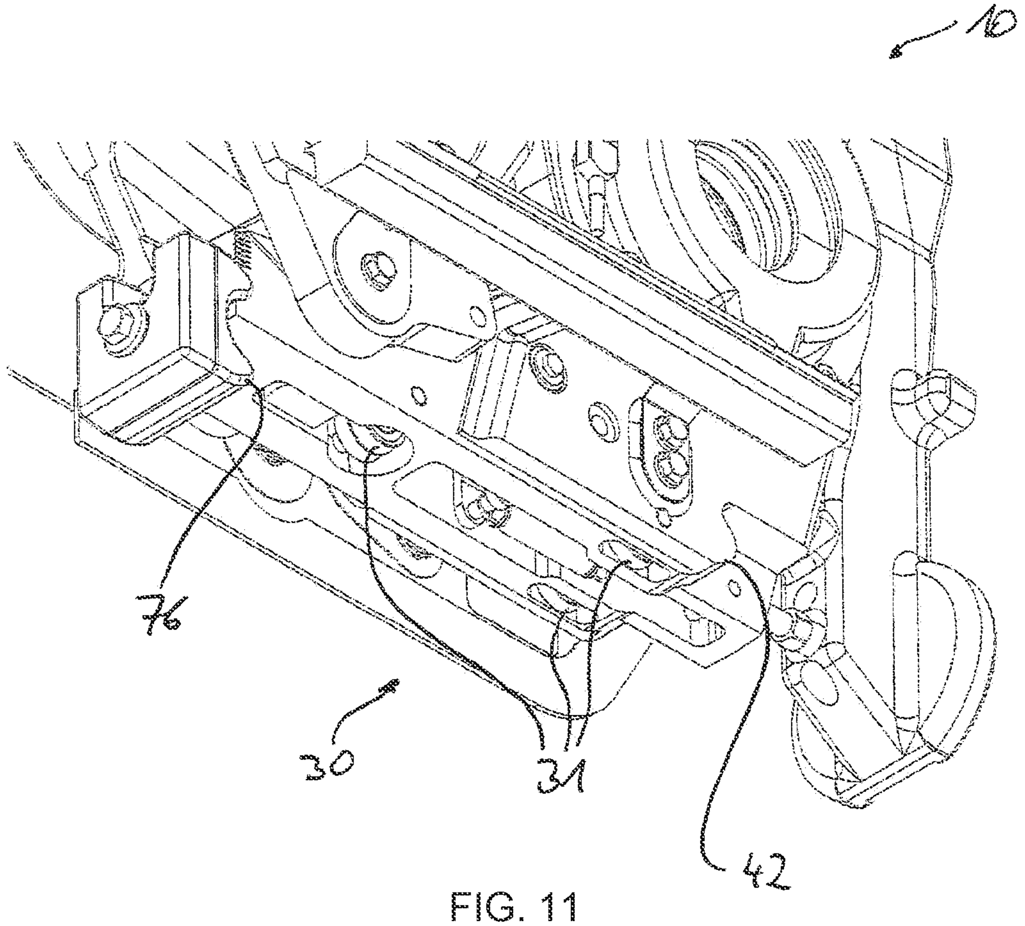
Figure 12:
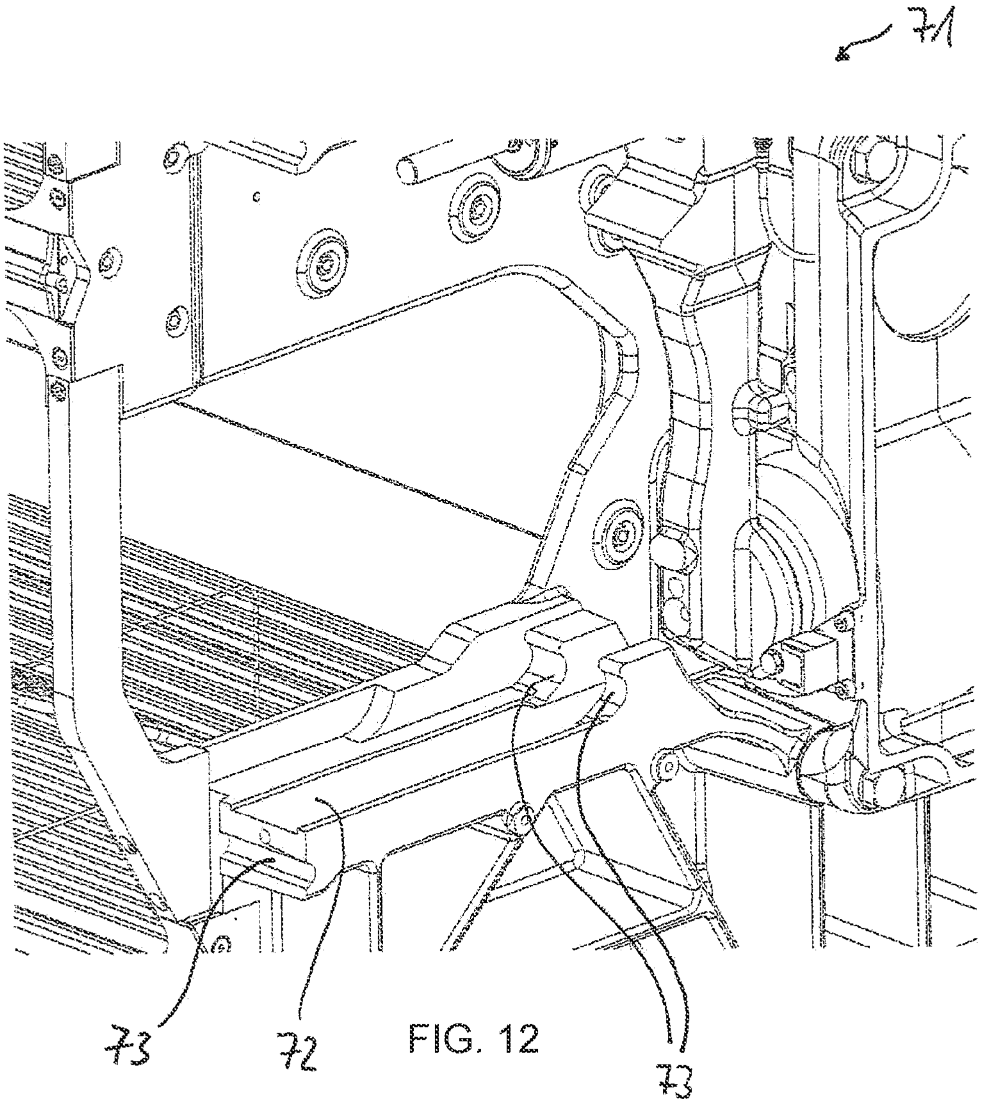

The invention will be explained below with reference to an exemplary embodiment and a number of drawings, in which FIG. 1: shows a roll assembly according to the invention in a moved-out position with a part of a tensioning device;

FIG. 2: shows the roll assembly according to the invention in a moved-in position with the part of the tensioning device;

FIG. 3*a*: shows a mill roll frame according to the invention with two roll assemblies according to the invention in a perspective view;

FIG. 3*b*: shows the mill roll frame according to the invention in a side view;

FIG. 3*c*: shows the mill roll frame according to the invention in a plan view;

FIG. 4: shows a mill roll frame according to the invention with a roll assembly according to the invention in a side view;

FIG. 5: shows a detail view of a handwheel and of a handwheel gear mechanism for finely setting the gap width;

FIG. 6: shows a detail view of a position indicator for indicating a position of the handwheel;

FIG. 7: shows a detail view of two force sensors for determining the force acting between the rolls;

FIG. 8: shows a detail view of the roll assembly for adjusting the bearing bodies;

FIG. 9: shows a sectional view through a rolling bearing of the roll assembly;

FIG. 10: shows a perspective view of the roll assembly with a collection trough for lubricant;

FIG. 11: shows a detail view of a rolling device of the roll assembly with rollers and contact surfaces;

FIG. 12: shows a detail view of the machine stand with rails and counter-contact surfaces.

FIGS. 1 and 2 show a roll assembly 10 for a mill roll frame in a side view. The roll assembly 10 comprises a first roll 11, which is held by two first bearing bodies 13, and a second roll 12, which is held by two second bearing bodies 14. The second bearing bodies 14 are pivotably supported on the first bearing bodies 13 via pivot bolts 57.

The mill roll frame 70 illustrated in FIGS. 3*a* to 3*c* has a machine stand 71 and two roll assemblies 10 which are arranged above one another and thus in a space-saving manner. Each roll assembly 10 can be driven by means of a gear mechanism 43 which comprises a bearing housing 44 in which an input shaft (not visible here), a first output shaft 46 and a second output shaft 47 are accommodated. The input shaft and the first output shaft 46 are arranged perpendicular to one another, and the first output shaft 46 and the second output shaft 47 are arranged parallel to one another. The input shaft and the first output shaft 46 are operatively connected to one another via a bevel gearwheel pair (not visible here), and the first output shaft 46 and the second output shaft 47 are operatively connected to one another via a torque transmission arrangement (likewise not visible). The first output shaft is coupled to the first roll 11, and the second output shaft 47 is coupled to the second roll 12. For a detailed description of the gear mechanism 43, reference is made to the already mentioned international patent application PCT/EP2018/061793. The gear mechanism 43 allows the movable mounting of the second roll 12.

The first bearing body 13 further has a first abutment body 17 which can be rotated about a first axis of rotation A1 and which has a first abutment surface 18. The latter is formed by a circumferential surface 18 of the first abutment body 17 that is eccentric with respect to the first axis of rotation A1. The second bearing body 14 has a second abutment body 19 which can be rotated about a second axis of rotation A2 parallel to the first axis of rotation A1 and which has a second abutment surface 20. The latter is formed by a circumferential surface 20 of the second abutment body 19 that is rotationally symmetrical with respect to the second axis of rotation A2. The two abutment surfaces 18, 20 are formed and arranged on the bearing bodies 13, 14 in such a way that a contact of the abutment surfaces 18, 20 counteracts a contact of the rolls 11, 12, as will be explained below.

FIG. 1 illustrates a moved-out position of the roll assembly 10 in which the abutment surfaces 18, 20 are not in contact with one another. By means of a tensioning device 16, which is a constituent part of the machine stand 71 and is only partially illustrated here, the first bearing body 13 and the second bearing body 14 are adjustable relative to one another in such a way that a milling gap formed between the first roll 11 and the second roll 12 can be adjusted. The tensioning device 16 comprises a tension anchor 51, a tension bush 55 pivotably mounted on an upper end 67 of the tension anchor 51 via an articulation 54, a tension rod 52 partially accommodated in the tension bush 55 and pretensioned by means of a disk spring assembly 41, and a bellows cylinder 40 which is coupled to a lower end 68 of the tension anchor 51 and is illustrated only in FIG. 4. The tension rod 52 is coupled to the second bearing body 14 by a coupling device 66 arranged on the second bearing body 14. The tension anchor 51 is supported on the first bearing body 13 at a supporting point 75 as long as the roll assembly 10 is installed.

FIG. 4 shows a lateral view of a mill roll frame 70 with the roll assembly 10. By activating the bellows cylinder 40, the lower end 68 of the tension anchor 51 is pressed against the first bearing body 13 and supported thereon, with the result that the overall torque acting on the roll assembly 10 is reduced. Here, the tension anchor 51 is pivoted about the supporting point 75 and thus pulls on the tension bush 55 and on the tension rod 52 and thus via the coupling device 66 on the second bearing body 14. In this way, the first bearing body 13 and the second bearing body 14 are pretensioned with respect to one another in such a way that the first roll 11 and the second roll 12 are pressed toward one another.

The bearing via the bellows cylinders 40 produces an overload safeguard. In order in an overload situation (for example upon a foreign body entering the milling gap) to allow an immediate load relief, the bellows cylinder is coupled to a sufficiently dimensioned venting valve in order to be able to rapidly reduce the pressure prevailing in the bellows cylinder by opening the venting valve. Without opening the venting valve, there would also result a force increase, but this would be substantially lower than if only a spring assembly were present.

The moved-in position of the roll assembly 10 that is illustrated in FIG. 2 is achieved when the abutment surfaces 18, 20 come into contact with one another. If the force prevailing in the milling gap varies, only the pretensioning force between the bearing bodies 13, 14 changes, but not the relative position thereof. The rotational position of the first abutment body 17 determines the minimum width of the milling gap.

In order to be able to roughly set the width of the milling gap, the first axis of rotation A1 of the first abutment body 17 and the second axis of rotation A2 of the second abutment body 19 are arranged displaceably, to be precise in a direction perpendicular to the axes of rotation A1, A2.

The roll assembly 10 further has, for fine-setting of the width of the milling gap, a handwheel 21 which can be rotated about a handwheel axis of rotation H. The handwheel 21 is coupled to the first abutment body 17 via a handwheel gear mechanism 22 illustrated in FIG. 5. It is constituted in such a way that a rotation of the handwheel 21 causes a rotation of the first abutment body 17. It is thus possible for a comparatively small torque on the handwheel 21 to be converted into a large torque at the first abutment body 17. For the aforementioned purposes, the handwheel gear mechanism 22 has a high efficiency and a small gear mechanism backlash.

The roll assembly 10 further has a position indicator 26, which is shown in detail in FIG. 6, for indicating a position of the handwheel 21. The position indicator 26 comprises a position indicator housing 27 and an indicator element 28 which is movable along the handwheel axis of rotation H relative to the position indicator housing 27. The indicator element 28 is or can be pretensioned by means of at least one position indicator spring 29 in the direction of the handwheel axis of rotation H with respect to the position indicator housing 27 in such a way that it can be rotated about the handwheel axis of rotation H only upon overcoming the pretensioning brought about by the position indicator spring 29. This occurs by means of form-fitting elements 53 on the indicator element 28 and on the position indicator housing 27.

To determine the radial forces prevailing between the rolls 11, 12, the roll assembly 10 comprises a force-measuring device which comprises a first force sensor 24 and a second force sensor 25. The first force sensor 24 is integrated in the tensioning device 16, namely in the region of the articulation 54 formed between the tension anchor 51 and the tension rod 52; the second force sensor 25 is situated on the second abutment body 19 (see FIG. 7). In this way, the first sensor 24 can be used to determine a first force with which the first bearing body 13 and the second bearing body 14 are pretensioned with respect to one another, and the second sensor 25 can be used to determine a second force which acts between the first abutment body 17 and the second abutment body 19. From these forces there can be computationally determined the force acting between the rolls 11, 12.

FIG. 8 illustrates in detail how the second bearing bodies 14 are pivotably supported on the first bearing bodies 13 via pivot bolts 57. The first bearing bodies 13 each contain a wedge 39 through which an adjusting screw 56 is guided. A rotation of the adjusting screw 56 produces a displacement of the wedge 39 in a horizontal first direction R1 and hence a displacement of the pivot bolt 57 and of the second bearing body 14 in a second direction R2, which is vertical to the first direction R1. In this way, the second bearing bodies 14 are individually adjustable relative to the first bearing bodies 13, thus allowing tilting of the roller axes.

FIGS. 9 and 10 show in detail a rolling bearing 58 and the sealing thereof. A roll stub 33 of the second roll 12 is supported by an inner ring 59, a plurality of rolling bodies 60 and an outer ring 61. In the axial direction thereof there are situated an inner bearing cover 62 and an outer bearing cover 63 which on their inner sides 34 have grooves 64, which extend around the roller stub 33, for seals (not shown here) and guide channels 35 for lubricant. Also present are shoulders 65 which assist in slinging away the lubricant. The guide channel 35 of the outer bearing cover 63 is connected to an outlet opening 36 through which lubricant can exit the guide channel 35 of the outer bearing cover 63. Underneath the outlet opening 36 there is situated a collecting device 37 for collecting the lubricant, which is designed in the form of a trough 37. There is a connecting bore (not shown) between the interior and the guide channel 35 in order to prevent over-greasing and thus allow excessive grease to escape through this connecting bore. The mill roll frame 70 can be hygienically operated as a result.

As shown in FIG. 11, the roll assembly 10 has an integrated rolling device 30 with rollers 31. The rollers 31 are arranged on the roll assembly 10 in such a way that the roll assembly 10 can be placed on a horizontal base (not shown here) and moved thereon by means of the rollers 31. As shown in FIG. 12, the machine stand 71 of the mill roll frame 70 has rails 72 on which the rollers 31 of the roll assembly 10 can move during mounting and/or demounting of the roll assembly 10. The roll assembly 10 further has front contact surfaces 76 (see FIG. 8) and rear contact surfaces 42, and the machine stand 71 has corresponding counter-contact surfaces 73. The contact surfaces 42, 76 and the counter-contact surface 73 are tailored to one another and to the rails 72 in such a way that, in a mounted position of the roll assembly 10, by virtue of a form-fitting engagement between the contact surface 42, 76 and the counter-contact surface 73, the rollers 31 do not lie on the rail 72.

The invention claimed is:

1. A milling apparatus (70), comprising a machine stand (71) and at least one roll assembly (10) with a first roll (11) and a second roll (12) that is or can be inserted in the machine stand (71), wherein the roll assembly has an integrated rolling device (30) having at least one roller (31) which is or can be arranged on the roll assembly (10) in such a way that the roll assembly can be placed onto a horizontal base and moved thereon by means of the at least one roller (31), wherein the machine stand (71) has at least one rail (72) on which the at least one roller (31) of the roll assembly (10) is movable during mounting and/or demounting of the roll assembly (10), the roll assembly (10) has at least one contact surface (42, 76) and the machine stand (71) has at least one counter-contact surface (73), wherein the contact surface (42, 76) and the counter-contact surface (73) are tailored to one another and to the at least one rail (72) in such a way that, in a mounted position of the roll assembly (10), by virtue of at least one form-fitting engagement between the at least one contact surface (42, 76) and the at least one counter-contact surface (73), the at least one roller (31) of the roll assembly (10) does not lie on the rail (72)), and wherein the roll assembly (10) has a force-measuring device that comprises:

a first sensor (24) for directly or indirectly determining a first force with which the first bearing body (13) and the second bearing body (14) are pretensioned with respect to one another; and a second sensor (25) for directly or indirectly determining a second force with acts between the first abutment body (17) and the second abutment body (19).

2. The milling apparatus (70) according to claim 1, wherein the first roll (11) is held by at least one first bearing body (13), and the second roll (12) is held by at least one second bearing body (14), wherein the first bearing body (13) and the second bearing body (14) are adjustable relative to one another in such a way that a milling gap formed between the first roll (11) and the second roll (12) is adjustable, wherein the first bearing body (13) and the second bearing body (14) can be pretensioned with respect to one another by means of a tensioning device (16) in such a way that the first roll (11) and the second roll (12) are pressed towards one another, wherein the first bearing body (13) has at least one first abutment body (17) with a first abutment surface (18), and the second bearing body (14) has at least one second abutment body (19) with a second abutment surface (20), the abutment surfaces (18, 20) are formed and are or can be arranged on the bearing bodies (13, 14) in such a way that a contact of the abutment surfaces (18, 20) counteracts a contact of the rolls (11, 12), the first abutment body (17) is rotatable about a first axis of rotation (A1), and the first abutment surface (18) is formed by a circumferential surface (18) of the first abutment body (17) that is eccentric with respect to the first axis of rotation (A1), with the result that the rotational position of the first abutment body (17) determines the minimum width of the milling gap.

3. The milling apparatus (70) according to claim 2, wherein the second abutment body (19) is rotatable about a second axis of rotation (A2) which is parallel to the first axis of rotation (A1), and the second abutment surface (20) is formed by a circumferential surface (20) of the second abutment body (19) that is rotationally symmetrical with respect to the second axis of rotation (A2).

4. The milling apparatus (70) according to claim 2, wherein the first axis of rotation (A1) of the first abutment body (17) and/or the second axis of rotation (A2) of the second abutment body (19) are/is arranged displaceably.

5. The milling apparatus (70) according to claim 2, wherein the roll assembly (10) has a handwheel (21) which can be rotated about a handwheel axis of rotation (H) and which is coupled via a handwheel gear mechanism (22) to the first abutment body (17) in such a way that a rotation of the handwheel (21) causes a rotation of the first abutment body (17).

6. The milling apparatus (70) according to claim 1, wherein the roll assembly (10) comprises a handwheel (21) which is rotatable about a handwheel axis of rotation (H) and by means of which a milling gap formed between the first roll (11) and the second roll (12) can be set, wherein the roll assembly (10) has a position indicator (26) for indicating a position of the handwheel (21), and the position indicator (26) comprises a position indicator housing (27) and an indicator element (28) which is movable along the handwheel axis of rotation (H) relative to the position indicator housing (27) and which is or can be pretensioned by means of a position indicator spring (29) in the direction of the handwheel axis of rotation (H) with respect to the position indicator housing (27) in such a way that it can be rotated about the handwheel axis of rotation (H) only upon overcoming the pretensioning brought about by the position indicator spring (29).

7. The milling apparatus (70) according to claim 6, wherein at least one of the bearing bodies (13, 14) has a rolling bearing (58) which supports a roll stub (33) of one of the rolls (11, 12), wherein a bearing cover (63) of the rolling bearing (58) has on its inner side (34) a guide channel (35) for lubricant that extends around the roll stub (33) and is connected to an outlet opening (36) through which lubricant can exit the guide channel (35).

8. The milling apparatus (70) according to claim 6, wherein the first roll (11) is held by two first bearing bodies (13), the second roll (12) is held by two second bearing bodies (14), and the first bearing bodies (13) are adjustable independently of one another and/or the second bearing bodies (14) are adjustable independently of one another.

9. The milling apparatus (70) according to claim 1, wherein the machine stand (71) has a tensioning device (16), and the roll assembly (10) has a coupling device (66) which is intended for releasably coupling the roll assembly (10) to the tensioning device (16).

10. The milling apparatus (70) according to claim 9, wherein the tensioning device (16) has a cylinder (40).

11. The milling apparatus (70) according to claim 9, wherein the tensioning device (16) has at least one pretensioned spring (41).

* * * * *